United States Patent
Gautron et al.

(10) Patent No.: US 9,501,865 B2
(45) Date of Patent: Nov. 22, 2016

(54) SYSTEM, METHOD, AND COMPUTER PROGRAM PRODUCT FOR DETERMINING A QUANTITY OF LIGHT RECEIVED BY AN ELEMENT OF A SCENE

(71) Applicant: NVIDIA Corporation, Santa Clara, CA (US)

(72) Inventors: Pascal Albert Gautron, Berlin (DE); Carsten Alexander Waechter, Berlin (DE); Marc Droske, Wellington (NZ); Lutz Kettner, Berlin (DE); Alexander Keller, Berlin (DE); Nikolaus Binder, Berlin (DE); Ken Patrik Dahm, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 203 days.

(21) Appl. No.: 14/165,403

(22) Filed: Jan. 27, 2014

(65) Prior Publication Data

US 2015/0215512 A1 Jul. 30, 2015

Related U.S. Application Data

(60) Provisional application No. 61/877,906, filed on Sep. 13, 2013.

(51) Int. Cl.
*G06T 15/50* (2011.01)
(52) U.S. Cl.
CPC ................................ *G06T 15/50* (2013.01)

(58) Field of Classification Search
CPC ............... G06T 15/506; G06T 15/50; G06T 15/80; G06T 15/60; G06T 15/06
USPC ........................................................ 345/426
See application file for complete search history.

(56) References Cited

U.S. PATENT DOCUMENTS

| 4,769,666 A | 9/1988 | Kumakura |
| 7,952,583 B2 | 5/2011 | Waechter et al. |
| 7,969,438 B2 | 6/2011 | Xie |
| 2003/0202120 A1 | 10/2003 | Mack |
| 2009/0167763 A1* | 7/2009 | Waechter ............... G06T 15/06 345/426 |
| 2012/0038643 A1* | 2/2012 | Keller .................... G06T 15/50 345/426 |
| 2014/0313198 A1 | 10/2014 | Keller et al. |
| 2015/0250983 A1* | 9/2015 | Ruijters .................. A61B 6/12 604/95.04 |

OTHER PUBLICATIONS

"Monte Carlo Volume Rendering" (IEEE Visualization 2003, Oct. 19-24, 2003, Seattle, Washington, USA, by Balazs Csebfalvi, Laszlo Szirmay-Kalos).*

(Continued)

*Primary Examiner* — Ke Xiao
*Assistant Examiner* — Gordon Liu
(74) *Attorney, Agent, or Firm* — Zilka-Kotab, PC

(57) ABSTRACT

A system, method, and computer program product are provided for determining a quantity of light received by an element of a scene. In use, a quantity of light received by a first element of the scene is determined by averaging a quantity of light received by elements of the scene that are associated with a selected set of light paths.

18 Claims, 6 Drawing Sheets

(56) References Cited

OTHER PUBLICATIONS

Bartolini et al., "Using the Time Warping Distance for Fourier-Based Shape Retrieval," Tech Report, DEIS—IEIIT—CNR, University of Bologna, 2002, pp. 1-34.

Bentancor, M. D., "Two Problems of Digital Image Formation: Recovering the Camera Point Spread Function and Boosting Stochastic Renderers by Auto-Similarity Filtering," PhD thesis, Ecole Normale Superieure de Cachan and Universidad de la Republica, 2013, pp. 1-153.

Kass et al., "Smoothed Local Histogram Filters," In Proceedings of SIGGRAPH â€ 10, 2010, pp. 1-10.

Keller, A., "Instant Radiosity," In Proceedings of SIGGRAPH, 1997, pp. 1-8.

Keller, A., "Quasi-Monte Carlo Image Synthesis in a Nutshell," in Monte Carlo and Quasi-Monte Carlo Methods 2012, J. Dick, F. Kuo, G. Peters, and I. Sloan, editors, Springer, 2012, pp. 1-37.

Kontkanen et al., "Irradiance Filtering for Monte Carlo Ray Tracing," In D. Talay and H. Niederreiter, editors, Monte Carlo and Quasi-Monte Carlo Methods 2004, Springer, 2004, pp. 1-14.

Krivanek et al., "Radiance Caching for Efficient Global Illumination Computation," IEEE Transactions on Visualization and Computer Graphics, 2005, pp. 1-17.

Mehta et al., "Axis-Aligned Filtering for Interactive Physically-Based Diffuse Indirect Lighting," Proceedings of SIGGRAPH 2013, ACM Transactions on Graphics, vol. 32, No. 4, 2013, pp. 1-11.

Wald et al., "Interactive Global Illumination," Tech Report TR-2002-02, Computer Graphics Group, Saarland University, 2002, pp. 1-9.

Wang et al., "Image Quality Assessment: From Error Visibility to Structural Similarity," IEEE Transactions on Image Processing, vol. 13, No. 4, 2004, pp. 600-612.

Ward et al., "A Ray Tracing Solution for Diffuse Interreflection," In Computer Graphics, 1988, pp. 1-8.

International Search Report and Written Opinion from International Application No. PCT/US2014/055255, dated Dec. 24, 2014.

O'Rorke, J., "Managing Visibility for Per-Pixel Lighting," Chapter 15, Nvidia Corporation, 2007, pp. 1-14, retrieved from http://http.developer.nvidia.com/GPUGems/gpugems_ch15.html.

Pellacini, F., "Distribution Ray Tracing," 2006, pp. 1-16, retrieved from http://pellacini.di.uniroma1.it/teaching/graphics08/lectures/16_DistributionRayTracing_Web.pdf.

Inancini, M., "Per-Pixel Lighting Data Analysis," Berkeley National Laboratory, 2005, pp. 1-29.

Keller, A., "Quasi-Monte Carlo Methods for Photorealistic Image Synthesis," PhD thesis, University of Kaiserslautern, 1998, pp. 1-137.

\* cited by examiner

SYSTEM, METHOD, AND COMPUTER PROGRAM PRODUCT FOR DETERMINING A QUANTITY OF LIGHT RECEIVED BY AN ELEMENT OF A SCENE

CLAIM OF PRIORITY

This application claims the benefit of U.S. Provisional Application No. 61/877,906, filed Sep. 13, 2013, the entire contents of which is incorporated herein by reference.

FIELD OF THE INVENTION

The present invention relates to computer graphics, and more particularly to performing ray tracing within a scene.

BACKGROUND

Ray tracing is a popular technique for generating an image and is performed by following a path of light through pixels in an image plane. However, current techniques for performing ray tracing have been associated with various limitations.

For example, ray tracing may be prone to noise due to one or more factors (e.g., an under sampling of illumination, materials, etc.). There is thus a need for addressing this and/or other issues associated with the prior art.

SUMMARY

A system, method, and computer program product are provided for determining a quantity of light received by an element of a scene. In use, a first element of a scene that is associated with a first light path of the scene is identified, where the first light path is associated with a plurality of elements of the scene. Additionally, a second element of the scene that is associated with the light path is selected, using a selection heuristic. Further, properties of the first and second elements of the scene are determined. Further still, a first set of light paths is selected, where each element of the first set of light paths satisfies a first similarity measure with the first light path of the scene. Also, statistical information from the determined properties of the first and second elements of the scene and the selected first set of light paths is determined. In addition, a second set of light paths is selected, where each element of the second set of light paths satisfies a second similarity measure with the first light path of the scene and the determined statistical information. Furthermore, a quantity of light received by the first element of the scene is determined by averaging a quantity of light received by elements of the scene that are associated with the selected set of light paths.

DETAILED DESCRIPTION

Figure 1:
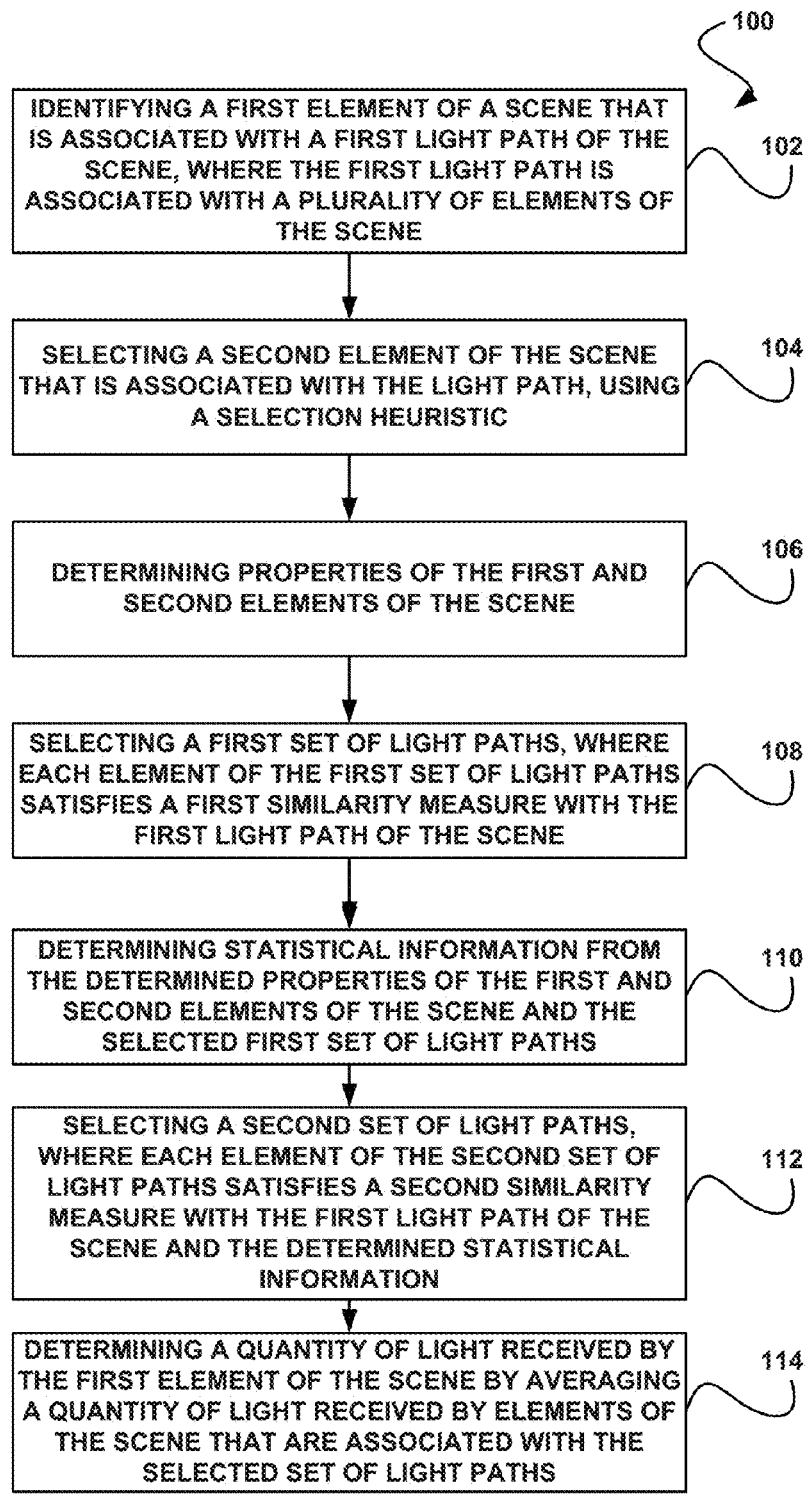
FIG. 1 shows a method for determining a quantity of light received by an element of a scene, in accordance with one embodiment.

FIG. 1 shows a method 100 for determining a quantity of light received by an element of a scene in accordance with one embodiment. As shown in operation 102, a first element of a scene that is associated with a first light path of the scene is identified, where the first light path is associated with a plurality of elements of the scene. In one embodiment, the scene may include a scene to be rendered. In another embodiment, a plurality of objects may be included within the scene. In yet another embodiment, each of the plurality of elements of the scene may include a pixel of the scene.

Additionally, in one embodiment, a light path of the scene may include a ray or path of light travelling through the scene (e.g., through pixels of the scene, etc.). For example, the light path may start at a light source and may travel until it reaches a camera. In another embodiment, the first light path may be associated with the plurality of elements of the scene in that the light path intersects the plurality of elements. In yet another embodiment, each light path may correspond to a predetermined pixel of an image within the scene.

Further, as shown in operation 104, a second element of the scene that is associated with the light path is selected, using a selection heuristic. In one embodiment, the selection heuristic may include one or more selection criteria. For example, the second element of the scene may be selected based on one or more of a quantity of light received by the second element, optical properties of the second element, and an arbitrary value. In another embodiment, the arbitrary value may be obtained by combining a position of the first element in a generated image with at least one of a pseudo-random number generator or quasi-Monte Carlo points.

Further still, as shown in operation 106, properties of the first and second elements of the scene are determined. In one embodiment, the properties of the first and second elements may include one or more of a location of the first and second elements in space (e.g., within the scene, etc.), a surface normal of the first and second elements, a diffuse reflectance of the first and second elements, and a quantity of light received by the first and second elements.

Also, as shown in operation 108, a first set of light paths is selected, where each element of the first set of light paths satisfies a first similarity measure with the first light path of the scene. In one embodiment, the first set of light paths may be selected from all available light paths within the scene (e.g., all light paths existing at a predetermined time within the scene, etc.). In another embodiment, the first set of light paths may be selected by comparing a plurality of light paths to the first light path of the scene (e.g., to determine whether the first similarity measure is satisfied by the first light path and each element of the said plurality of light paths).

In addition, in one embodiment, the first similarity measure may be satisfied based on one or more criteria associated with each light path. For example, first similarity measure may be based on one or more of the relative positions of image pixels corresponding to each light path, a divergence of surface normals at selected elements associated with each light path, and a distance between selected elements associated with each light path.

Furthermore, as shown in operation 110, statistical information from the determined properties of the first and second elements of the scene and the selected first set of light paths is determined. In one embodiment, determining the statistical information may include a plurality of additional determination steps. For example, determining the statistical information may include determining a median of quantities of light transmitted by each light path of the first set of light paths. Additionally, determining the statistical information may include determining an average of quantities of light transmitted by each light path of the first set of light paths. Further, determining the statistical information may include determining information representative of a distribution of quantities of light in the first set of light paths.

Further still, in one embodiment, determining information representative of a distribution of quantities of light in the first set of light paths may include one or more additional determinations. For example, determining information representative of a distribution of quantities of light in the first set of light paths may include, for each light path of the first set of light paths, determining a representation range for the quantities of light transmitted by the light path using a difference between the determined median and the determined average of the quantities of light transmitted by the path. Additionally, determining information representative of a distribution of quantities of light in the first set of light paths may include determining projection coefficients in a function basis, where the coefficients are representative of the distribution of the quantities of light within the representation range.

Also, as shown in operation 112, a second set of light paths is selected, where each element of the second set of light paths satisfies a second similarity measure with the first light path of the scene and the determined statistical information. In one embodiment, the second set of light paths may be selected from a plurality of existing light paths within the scene. In another embodiment, selecting the second set of light paths that satisfies the second similarity measure may include a plurality of additional determinations.

For example, selecting the second set of light paths may include determining a surface normal similarity by comparing a surface normal of the selected elements associated with each of the light paths. Additionally, selecting the second set of light paths may include determining a distance between selected elements associated with each of the light paths. Further, selecting the second set of light paths may include determining a length of each of the light paths. Further still, selecting the second set of light paths may include determining a difference between the determined statistical information for each of the light paths. Also, selecting the second set of light paths may include determining that the light paths are similar if the determined surface normal similarity, distance, length, and statistical information difference are below predetermined threshold values.

Additionally, in one embodiment, determining the difference between the determined statistical information for each of the light paths may include comparing values of a median and average quantity of light transmitted by each light path of the first set of light paths, and determining a difference between information representative of a distribution of quantities of light transmitted by each path of the first set of light paths. For example, the difference between information representative of the distribution of quantities of light transmitted by each path of the first set of light paths may be determined by comparing projection coefficients of each path.

Further, in one embodiment, the second set of light paths may contain the first light path only if a ratio between a quantity of light transmitted by the first light path and the median of quantities of light transmitted by each light path of the first set of light paths is below a predetermined threshold.

Further still, in one embodiment, selecting the second set of light paths that satisfies the second similarity measure may include determining whether a virtual light path connecting the first element and the second element through a camera lens can be created, and determining that the light paths are similar, if the virtual light path can be created.

Also, in one embodiment, the second set of light paths may be obtained by selecting a subset of a plurality of light paths corresponding to pixels neighboring a pixel that corresponds to the first light path. For example, the subset of the plurality of light paths corresponding to pixels may be determined by determining a maximum distance between elements associated with the second set of light paths that satisfy the second similarity measure.

Additionally, in one embodiment, the subset of the plurality of light paths corresponding to pixels may be reduced by arbitrarily removing pixels. For example, the arbitrarily removed pixels may be selected using at least one of a pseudo-random number generator or quasi-Monte Carlo points and an offset value representative of a number of elements of the subset of the plurality of light paths corresponding to pixels.

Furthermore, as shown in operation 114, a quantity of light received by the first element of the scene is determined by averaging a quantity of light received by elements of the scene that are associated with the selected set of light paths. In this way, histogram-based filtering may be applied to a scene in order to perform image de-noising based on the observation that pixels with a similar distribution of incoming radiance can be considered similar, and hence combined, in order to reduce noise.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
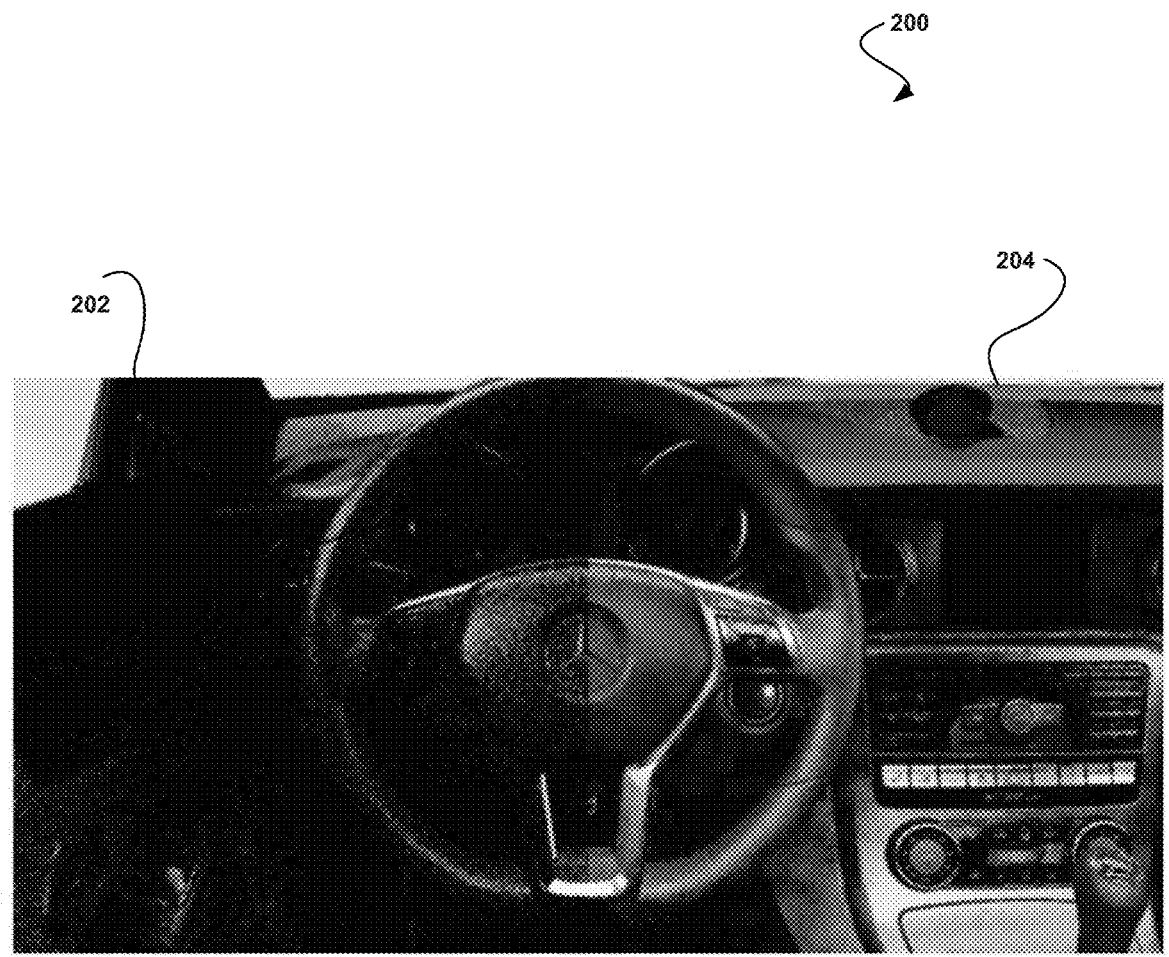
FIG. 2 shows an exemplary wavefront image that is rendered using a path tracer design, in accordance with another embodiment.

FIG. 2 shows an exemplary scene 200 in which path space filtering has been applied, in accordance with another embodiment. As an option, the path space filtering (PSF) in the scene 200 may be carried out in the context of the functionality of FIG. 1. Of course, however, the path space filtering in the scene 200 may be implemented in any desired environment. It should also be noted that the aforementioned definitions may apply during the present description.

As shown, a first portion 202 of the scene 200 illustrates a sample to which path space filtering has not been applied, while a second portion 202 of the scene 200 illustrates a sample to which path space filtering has been applied. In this way, noise due to under sampling of illumination, materials, etc. that exists during ray tracing may be reduced.

Discontinuity Buffer

In one embodiment, performing path space filtering may incorporate one or more techniques (e.g., one or more techniques for filtering, de-noising, etc.). For example, a discontinuity buffer may denoise images by a selective averaging of neighboring pixels. See, for example, "Quasi-Monte Carlo Methods for Photorealistic Image Synthesis"

(A. Keller, PhD thesis, University of Kaiserslautern, Germany, 1998), which is hereby incorporated by reference in its entirety. For each pixel the indirect illumination contribution, BRDF value and a surface identifier at the visible point may be stored in the discontinuity buffer. As a post-process the neighborhood of each pixel may be considered: the final value of the pixel may be estimated by averaging the values of neighboring pixels corresponding to the same surface identifier. Further selection may be obtained by measuring the similarity of surface normals. The averaging of values may be performed using uniform weights, or using a normalized filter such as a Gaussian filter.

In one embodiment, a Gaussian filter may be used to accumulate the values of neighboring pixels into local histograms. Additionally, high frequencies due to direct illumination, as well as multiple incoming light directions, may be handled.

In another embodiment, the discontinuity buffer may be refined to be combined with techniques inspired from instant radiosity. See, for example, "Instant radiosity" (A. Keller, In Proceedings of SIGGRAPH, 49-56, 1997), and "Interactive global illumination" (Wald et a., Tech Report TR-2002-02, Computer Graphics Group, Saarland University, 2002), which are hereby incorporated by reference in their entirety. In particular, interleaved sampling may be used to reduce the amount of virtual point lights (VPL) used when estimating the incoming radiance. For example, instead of sampling every VPL for each pixel (costly) or using a small number of VPLs (prone to aliasing), the image may be split into a set of small patches. Each pixel of a patch may be rendered using a given subset of the total VPL set. This technique may allow for the use of a large total number of VPLs, which may reduce aliasing at the cost of added structured noise. The discontinuity buffer may then be used to remove this noise.

Also, in one embodiment, interleaved sampling may also be employed in a technique: the first application may include the interleaved choice of the stored vertex along a path. The second application may include the reduction of the number of filtering candidates during PSF. Also, the technique may not be limited to point light sources, and may support any type of lighting and materials.

Irradiance Filtering

Irradiance filtering may be associated with the idea that on a single surface, the high frequencies in indirect lighting are synonym to noise in the irradiance estimate. See, for example, "Irradiance filtering for Monte Carlo ray tracing." (Kontkanen et al., In Monte Carlo and Quasi-Monte Carlo Methods, 259-272, 2004), which is hereby incorporated by reference in its entirety. Applying a lowpass filter may then effectively reduce noise. On the contrary, when several surfaces are present, the high frequency may be preserved to prevent the geometric edges from being blurred out. The level of discontinuity may then be estimated at each pixel depending on the distance to the neighbors and the local divergence of the surface normal. See, for example, "A ray tracing solution for diffuse interreflection" (Ward et al., In Proceedings of SIGGRAPH, 85-92, 1988), which is hereby incorporated by reference in its entirety. Depending on this discontinuity level neighboring pixels may be used to perform a weighted average, which may reduce the noise in the image. When the discontinuity level is high, noise reduction may be performed by casting additional rays to increase the quality of the irradiance estimate.

Additionally, in one embodiment, the discontinuity level at a given point along a light path may be estimated by computing the average distance to its surrounding geometry. To this end, the hemisphere above each path vertex may be sampled (e.g., using 16 rays, etc.). The irradiance, as well as the mean distance, may be stored with the vertex in a spatial data structure.

Further, in one embodiment, in a next step, the spatial neighborhood of each vertex may be examined to determine the existence of neighbors with similar properties. Depending on the quantity of neighbors eligible for filtering the algorithm may generate more rays to reach a desired quality. The contributions of the vertices along each path may then be accumulated, yielding the final image.

Further still, in one embodiment, the search range for eligible neighbors may be given by a spatial filter kernel in image space. Also, the observations relating the frequency of the lighting to the geometric properties of the surfaces may be used as selection criteria in PSF. Finally, the storage of path vertices may also be used with the PSF approach. In another embodiment, the problem of filtering both direct and indirect lighting may be addressed, with arbitrary materials. In yet another embodiment, further criteria for filtering selection may be introduced, and the use of a spatial data structure may be avoided.

Axis-Aligned Filtering

Axis-aligned filtering may denoise the results of Monte Carlo path tracing obtained using a limited number of samples. See, for example, "Axis-aligned filtering for interactive physically-based diffuse indirect lighting" (Mehta et al., Proceedings of SIGGRAPH, 96:1-96:12, 2013), which is hereby incorporated by reference in its entirety. In one embodiment, the hemisphere above each visible point may be sampled to determine the minimum and maximum distance to the surrounding objects. The level of discontinuity may be estimated by computing the frequency response of the BRDF of the surface. In another embodiment, the size of a kernel in image space may then be deduced from those parameters.

Additionally, axis-aligned filtering may require casting a sufficiently large number of rays (e.g., 16 rays per pixel, etc.) to obtain a reliable estimate of the minimum and maximum distances. In another embodiment, a focus may be made on removing noise from images generated using an extremely low number of samples (e.g., 1 sample per pixel, etc.), in production-quality scenes featuring arbitrary materials. Measures and heuristics may then be derived to estimate the variations of both BRDF and environment for efficient filtering.

Smoothed Local Histogram Filters

Smoothed local histogram filters may include the use of local histograms to perform image filtering in general. See, for example, "Smoothed local histogram filters" (Kass et al., In Proceedings of SIGGRAPH, 100:1-100:10, 2010), which is hereby incorporated by reference in its entirety. While not focused on denoising or image synthesis, it includes a number of insights: the use of the local neighborhood to generate the histograms, and the use of a filter to weight the contributions of neighboring pixels.

Histogram-Based Filtering

The idea of histogram-based filtering may be applied to image synthesis. See, for example, "Two Problems of Digital Image Formation: Recovering the Camera Point Spread Function and Boosting Stochastic Renderers by Auto-similarity Filtering" (M. D. Bentancor, PhD thesis, Ecole Normale Superieure de Cachan, France and Universidad de la Republica, Uruguay, 2013), which is hereby incorporated by reference in its entirety. Histogram-based filtering may propose valuable computer vision-oriented insights, and may perform best with several samples per pixel, in an offline process.

Path Space Filtering

Path space filtering (PSF) may reuse path elements generated when rendering other pixels of the image to improve the quality of the current pixel. See, for example, U.S. application Ser. No. 14/166,794, filed Jan. 28, 2014, which is hereby incorporated by reference in its entirety. This approach may require a number of choices and heuristics: which data structure to use, what to apply the filtering to, which path elements to store, which set of criteria to use to indicate that a path element can be reused to enhance another path, and how many other paths can be reused in a reasonable time.

Screen-Space Filtering and Progressive Rendering

One goal of rendering may include obtaining a high quality, very fast preview of arbitrary scenes, such that the overall filtering process may be performed in a very limited time. Also, the use of a uniform grid may not be considered as sparse scenes may result in either low sampling rates or wasted memory space. Therefore, path elements may be stored in a screen-aligned grid, in which nearest-neighbor searches may be performed through lookups in neighboring pixels. This approach may avoid a per-frame generation of a hierarchical data structure.

A progressive renderer may generate each image using a very low sampling rate (e.g., 1 sample per pixel, etc.). Quality may improve over time as images are combined together. While storing the samples generated for each image and using them for filtering may be useful, the related memory occupancy would be intractable in practice. Filtering may then be performed on each low-density image, and the results may be combined for progressive rendering.

Light Decomposition

The materials in a rendering engine may be generic, and therefore no assumption may be made on the surface properties. However, the material evaluation may return the irradiance, diffuse reflectance, reflected radiance due to surface glossiness, reflected radiance due to specular reflections, and self-emitted radiance. In another embodiment, following ideas of PSF and (ir)radiance caching, the diffuse component of the lighting may be of relatively low frequency, and thus filterable. See, for example, "Radiance caching for efficient global illumination computation" (Krivanek et al., IEEE Transactions on Visualization and Computer Graphics, 2005), which is hereby incorporated by reference in its entirety. Glossy reflections may also be filtered, provided the BRDF yields smooth reflections. Specular reflections and emission may be bad candidates for filtering as their value can vary arbitrarily.

At each path vertex we then compute and potentially store irradiance, diffuse reflectance, a glossy component, and a specular+emission component. Note that the storage of the irradiance instead of the reflected radiance may allow filtering on surfaces featuring high frequency diffuse textures without loss of visual details.

Path Space Interleaved Sampling

Figure 3:
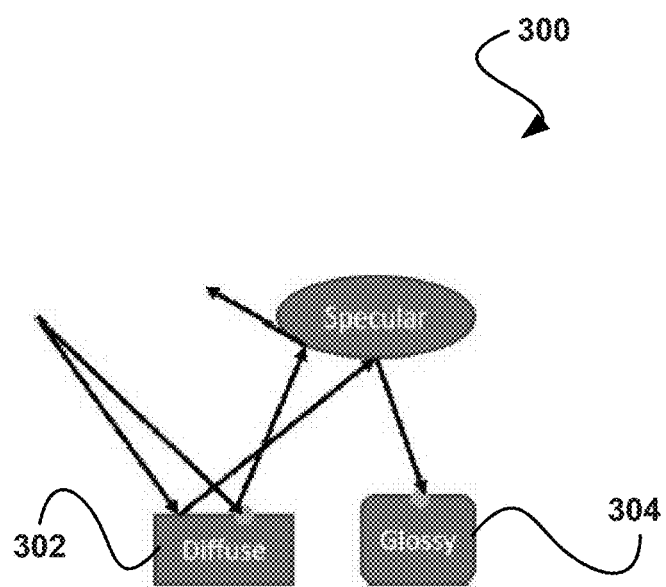
FIG. 3 displays an exemplary scene with eligible vertices laying on a diffuse surface and a glossy surface, in accordance with another embodiment.

PSF is based on the storage and reuse of path vertices. As the memory constraints for ray tracing may preclude the storage of every path vertex, only one vertex may be stored per pixel. The choice of the vertex along the path may be based on two criteria: eligibility and at least one of pseudo-random or quasi-Monte Carlo interleaved selection. FIG. 3 displays an exemplary scene 300 with eligible vertices laying on a diffuse surface 302 and a glossy surface 304. In one embodiment, the path vertex chosen for each pixel may depend on both eligibility and at least one of a pseudo-random or quasi-Monte Carlo choice among eligible vertices.

Additionally, in one embodiment, a vertex may be eligible for storage if one of these criteria is satisfied: nonzero irradiance, nonzero reflected radiance due to surface glossiness, and nonzero diffuse reflectance. That is, a vertex may be eligible if it contains filterable information. As several vertices along a path may be eligible, at least one of a pseudo-random or quasi-Monte Carlo choice may be used. As filtering a pixel may consider the data stored for the neighboring pixels, the idea is to spread the path information as much as possible so that the reconstruction can benefit from lighting information at as many light bounces as possible. Therefore, depending on a seed computed from the pixel index and the current ray depth, an eligible vertex may be selected or not. A simple pattern may be to keep the first hit for the first pixel, second hit for the second etc. and modulating by a chosen maximum number of bounces (e.g., up to 4, etc.).

As the n-th bounce may not exist for some paths, the algorithm may fall back to storing the last eligible vertex of the path. Also, limiting the maximum depth of the stored vertex may improve the quality of the first rendered frame in ray tracing, as very few samples may be available. The stored information may also include the first hit of the ray, used for both PSF criteria and depth of field estimation. Note that all sampling may be implemented using deterministic consistent quasi-Monte Carlo methods. See, for example, "Quasi-Monte Carlo image synthesis in a nutshell" (A. Keller, In Monte Carlo and Quasi-Monte Carlo Methods 2012, J. Dick, F. Kuo, G. Peters, and I. Sloan, Eds. Springer, 203-238., 2013), which is hereby incorporated by reference in its entirety.

Path Selection

The original heuristics to determine whether to reuse a neighboring path vertex may include criteria on the distance between the shaded point and the candidate vertex, and the divergence of normals at those points (e.g., n.n'>0.95).

Distance Criterion

A fixed criterion for the allowed filtering distance may result in either overly filtered zones close to the viewer, or a high level of remaining noise in distant areas. Considering neighboring pixels hitting the same surface, the distance between the hit points may grow linearly with the ray length. For a given ray its ray length may be estimated by computing the distance $l_e$ from the eye to the first hit, and the distance $l_v$ from the first hit to the stored vertex. This may include a heuristic, as the divergence may vary greatly after the first bounce, and as the stored vertex may result from bounces farther than the second one.

Table 1 illustrates the distance criterion between two vertices v and v', in accordance with one embodiment. Of course, it should be noted that the distance criterion shown in Table 1 is set forth for illustrative purposes only, and thus should not be construed as limiting in any manner.

TABLE 1

$$\frac{|v - v'|}{l_e + l_v} \le d_t$$

As shown above, $d_t$ may include a user-defined threshold (e.g., 0.05, etc.).

Glossy Consistency Check

Figure 4:
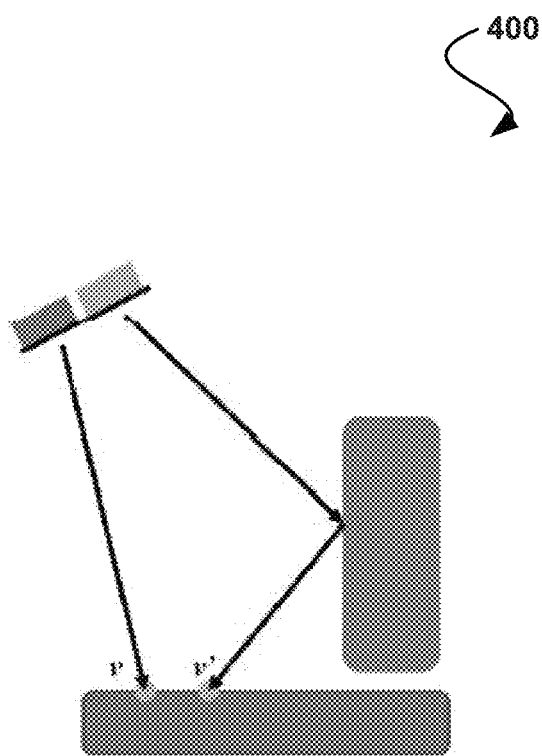
FIG. 4 illustrates an example where merging the glossy component of vertices stored at different bounces may result in erroneous bleeding, in accordance with another embodiment.

The lack of knowledge on the BRDF properties of the materials may preclude a separate storage of the incoming radiance and the glossy reflectance of the surface. Therefore, the glossy component of the lighting may be the product of those terms, accumulated over the path. Averaging contributions from various bounces can result in undesired color bleeding. FIG. 4 illustrates an example 400 where merging the glossy component of vertices stored at different bounces may result in erroneous bleeding, as the glossy component may represent the glossy contributions gathered along the entire paths. Averaging this component over v and v' would then add a first color on an object of a second color and vice-versa.

This issue may be addressed by constraining which contributions are averaged: paths may be merged only if the stored vertices are both on the first hit, or both at a further hit. While this only differentiates the first bounce from the others, bleeding due to further bounces may be unnoticeable in practical scenes.

Histogram-Based Filtering

Histogram based filtering is a technique for image denoising based on the observation that pixels with a similar distribution of incoming radiance can be considered similar, and hence combined to reduce the noise in the image. In one embodiment, using a single sample per pixel may not provide meaningful histograms, and as a result, a neighborhood of the pixels may be considered. As simply aggregating neighboring pixels may result in a loss of local precision (edges), a weighted histogram may be generated, in which the contribution of a neighboring pixel may be weighted by its distance from the pixel at which the histogram is calculated. In practice a Gaussian filter may be used to weight the contributions. Both the histogram and the Gaussian-filtered radiance value of the pixel may then be stored.

Additionally, in one embodiment, this filtering may be performed by selecting similar pixels within a 5×5 neighborhood. Two neighboring pixels may be considered similar if their hit points satisfy normals divergence and distance criteria shown above. If a pixel does not have a sufficient number of similar neighbors (e.g., at least 40% of its neighbors, etc.) the pixel statistics may be considered to be not reliable. In this case the pixel may be flagged so that its values cannot be used when filtering its neighbors during PSF.

While this technique may be very effective for low or medium dynamic range images, building and comparing histograms of arbitrary High Dynamic Range (HDR) sample sets may raise issues of binning resolution and memory usage. To overcome this problem Fourier-based histogram descriptors may be used.

Fourier HDR Histogram Descriptors

The extension of histogram-based filtering to HDR may be nontrivial as the input values can vary widely, which may make bucketing impractical. This discrete histogram representation may then be replaced by a projection of the histogram into Fourier series.

An accurate storage of Fourier coefficients for a full range of radiances may require a massive amount of memory per pixel. However, the distance between histograms may be performed by computing the accumulated difference of the buckets. Consequently, the distance may be mostly affected by the largest values of the bins, which may be located in the center of the sample distribution.

One approach to reduce the range of the Fourier representation may include centering the histogram on the average of the samples, and using a multiple of the standard deviation to determine the range. However, using a 5×5 neighborhood to generate the histogram only provides up to 25 samples, resulting in a very high variance.

Another approach may include estimating the deviation of the distribution by computing the difference between the average and the median values of the samples. The median may be relatively robust to noise. Consequently, the histograms of similar pixels may be centered around similar median values. The average may provide information on the amount of outliers.

Table 2 illustrates the m-th complex Fourier series coefficient, in accordance with one embodiment. Of course, it should be noted that the m-th complex Fourier series coefficient shown in Table 2 is set forth for illustrative purposes only, and thus should not be construed as limiting in any manner.

TABLE 2

$$c_m = \sum_{l=0}^{N-1} w(x_l) \exp(-j2\pi x_l) = R_m \exp(-j\Theta_m)$$

where $w(x_l)$ is the weighted value attic l-th sample and $x_l \in [0, 1]$ is the normalized value of the sample contribution.
The value $R_m$ and $\Theta_m$ are respectively the modulus and argument of the coefficient In one embodiment, a direct consequence of the range reduction may include the non-alignment of the histograms of neighboring pixels, precluding a direct comparison. This issue may be addressed by considering histogram comparison as a shape retrieval problem: similar pixels may yield histogram with similar shapes, albeit potentially shifted or scaled depending on the local average and standard deviation of the samples. The Fourier HDR histogram may then be considered as a Fourier descriptor of the histogram shape.

In another embodiment, modifications of the Fourier coefficients may be performed to obtain a translation-, rotation-, scale- and starting-point-invariant representation. See, for example, "Using the time warping distance for Fourier-based shape retrieval" (Bartolini et al., Tech Report, DEIS-IEIIT/BO-CNR, University of Bologna, 2002), which is hereby incorporated by reference in its entirety. In yet another embodiment, the equivalent of the translation may be a scale of the values, which may remain detectable. Therefore, only the other coefficient modifications are kept.

Table 3 illustrates the modification of the coefficient argument to make it translation and scale invariant, in accordance with one embodiment. Of course, it should be noted that the modification shown in Table 3 is set forth for illustrative purposes only, and thus should not be construed as limiting in any manner.

TABLE 3

$$\hat{\Theta}_m = \Theta_m - \frac{\Theta_1 + \Theta_{-1}}{2} + m\frac{\Theta_{-1} - \Theta_1}{2}$$

Additionally, in one embodiment, the real and imaginary parts of the altered coefficients may be computed and stored, resulting in robust HDR histogram descriptors. The similarity between the descriptors may be computed using a simple distance on the coefficient vectors. For example, four complex coefficients may be stored per histogram, representing the grayscale distribution.

Although the grayscale conversion may result in collisions, in practice this approximation may not lead to visible artifacts. Another possibility may be to compute the descriptor, reconstruct the scale and phase invariant signal, and use the classical binning to store the descriptor. This may reduce the storage needs, at the expense of additional computations during the generation of the descriptor. A quantification of the projection coefficients may also be considered.

Statistics-Based Criteria

Using the above statistical per-pixel information criteria may be deduced for PSF. Table 4 illustrates a criterion that may be satisfied by neighboring points on their median values M and M', in accordance with one embodiment. Of course, it should be noted that the criterion shown in Table 4 is set forth for illustrative purposes only, and thus should not be construed as limiting in any manner.

TABLE 4

$$\frac{|M - M'|}{\max(M, M')} < M_t$$

In one embodiment, Mt may include a user-defined threshold (e.g., equal to 0.9, etc.). This criterion may allow for a fast elimination of samples with overly different median values, for which the histograms would either not overlap, or have a very large deviation making the histogram comparison meaningless.

In another embodiment, the overlap of the stored histograms may be tested by comparing their median and deviation. The histogram comparison may then be performed using an L1 distance to evaluate similarity, and this distance may be compared to a threshold (e.g., 20.0, etc.).

In yet another embodiment, the criteria may first be applied to the diffuse component. As this component tends to have the lower frequency, median and histogram tests for the glossy component may be performed only if the diffuse criteria are satisfied.

Screen-Space Sampling

Efficient noise removal may require lookups in relatively large windows around the pixel of interest. In practice a maximum of a 21×21 window may be used, which may yield 441 potential contributors for each pixel in the image. In order to reduce the memory bandwidth required by the algorithm, interleaved sampling may be used, typically sampling every 4-th pixel.

To avoid visible patterns in the final image, an offset in the interleaving pattern may be chosen by at least one of a pseudo-random or quasi-Monte Carlo choice for each pixel, ranging from 0 to half the filter width. Further efficiency may be obtained by reducing the kernel size for distant objects. In the PSF algorithm a neighboring pixel may be filtered only if its properties fulfill every criterion. As one of the PSF criteria may be based on the distance to the central point, the kernel size may be computed from the maximum allowed distance. More precisely, the radius of a sphere may be estimated around the point of interest, so that this sphere encompasses every potentially contributing point. This sphere may then be projected onto the image plane. The radius of the projected sphere may then define the radius of the filter.

Additional Filtering: Outlier Detection and Removal

The simulation of complex light paths using Monte Carlo path tracing may generate strong outliers, especially when computing global illumination on glossy surfaces. Those outliers may result in persistent artifacts, which tend to be spread on large areas of the image when using PSF. Table 5 illustrates the elimination of outliers of glossy contributions during the construction of the pixel statistics by comparing the value of the pixel contribution with the median value over its 5×5 neighborhood, in accordance with one embodiment. Of course, it should be noted that the elimination shown in Table 5 is set forth for illustrative purposes only, and thus should not be construed as limiting in any manner.

TABLE 5

$$\frac{L}{M} \le R_t,$$

As shown in Table 5, L is the radiance or irradiance value at the current pixel, and M is the median value computed over the pixel's neighborhood. In practice outliers may be characterized by very high values due to the sampling of paths with low probability. A very large threshold value Rt=25 may then be used to efficiently detect outliers.

In one embodiment, tagging a pixel as an 'outlier' may make it non-eligible for contributing to the neighboring pixels, which may avoid spreading the outlier in the PSF window. As one focus is on removing such pixels from the final image, the final value of outlier pixels may be obtained by averaging neighbor values only. Extreme values may then be discarded, which may provide a smoother yet reliable estimate of the lighting at the shaded point.

Fine-Scale PSF

The distance and normal criteria may be used to preserve edges in PSF. However, in addition to the selected path vertex store the first hit point of the ray may also be stored. After filtering a fine-scale filter (3×3) may be applied and the median components may be compared as well as the distances between the first hits and the stored vertices of the neighbors. This may partly compensate for the path space interleaved sampling by potentially adding overlooked contributors. The distance tolerance in this test may be reduced ($d_f$=0.01$d_t$) to compensate for the lack of normal comparison.

Median Filtering

The specular component may not suffer from noise due to sampling of ray directions. However, the lights contributing to the specular highlights may yield salt-and-pepper noise. Most of this noise may be removed by applying a 3×3 median filter on the specular component only.

Depth of Field

Distribution effects such as depth of field (DoF) can also benefit from the information stored for PSF, namely the coordinates of the first hit of each ray. Consistency may be enforced by reverting a lens sampling scheme of a ray tracing application—for each neighboring hit the location of the lens sample is determined that would have been used to generate a ray hitting the same location. If the estimated sample lies within the radius of the lens, the sample may be considered as contributing to the DoF effect.

Figure 5:
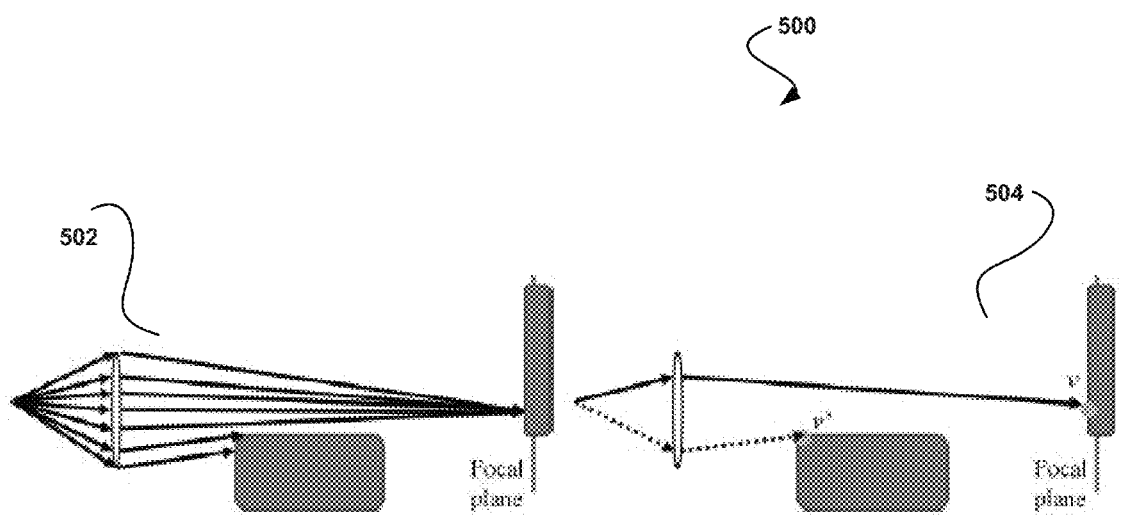
FIG. 5 illustrates a visible bias during depth of field calculations, in accordance with another embodiment.

This approach yields an important sampling issue: during ray tracing the ray tracing application uniformly samples the lens. Each sample then has the same weight, and the average of the samples converges to the solution. In the reverse approach, a number of samples may be obtained from an unknown distribution. Computing an average on these samples may then introduces a visible bias. Estimating a distribution from a number of samples may only be valid when the sample set is sufficiently large, which is usually not the case especially using small lens radii. FIG. 5 illustrates a visible bias during depth of field calculations 500. Depth of field may be computed by uniformly sampling the camera lens and combining the obtained results in one instance 502. Reusing an unknown distribution of points and treating it as uniform to estimate depth of field may result in a strong bias, especially if only a few samples are available, as shown in instance 504.

This issue may be overcome by observing where the strongest inconsistencies appear. Such issues are particularly visible when a visible object in on or close to the focal plane of the lens, and others are largely farther but still within the cone of confusion. In this case only one sample may be obtained on the focal plane, and potentially a few others. If the lens was sampled, most samples would have reached the point in focus, giving it an overall higher weight. Therefore, giving an equal importance to each recovered sample may introduce strong artifacts.

Keeping this observation in mind, the contributions of each pixel may be weighted as follows: a pixel contributing to the DoF effect may be added to the average value, with a weight of 1. For each noncontributing pixels the central value may be added to the average, with a weight of 1.

Another approach includes selecting the point closest to the focal plane as the one receiving the missed contributions. However, simply using the contribution of this point may put emphasis on a not-yet-filtered path, which may yield inconsistent noise in the image. This may be addressed by performing depth of field calculations in a further pass, at the cost of another large-kernel filtering.

The lighting simulation performed by a ray tracer may be based on quasi-Monte Carlo algorithms. Another solution for more efficient sampling may be to take advantage of the underlying sampling to select only relevant information from the filtering window. Further adjustment of the distribution approximation to reconstruct the lens sampling used in depth of field calculations may lead to more accurate results.

Reducing the overall footprint of the method (e.g., storage required by the method) may increase performance (as filtering may be highly bandwidth-bound) and free memory for scene storage.

In this way, additions to path space filtering techniques may result in effective noise removal and fast convergence when performing ray tracing. The algorithm may be finely tuned using a number of user-defined parameters. PSF introduces a fixed cost to the rendering, regardless of the complexity of the scene or underlying materials and lighting simulation. Also, depth of field effects may be estimated efficiently as a by-product of PSF.

Figure 6:
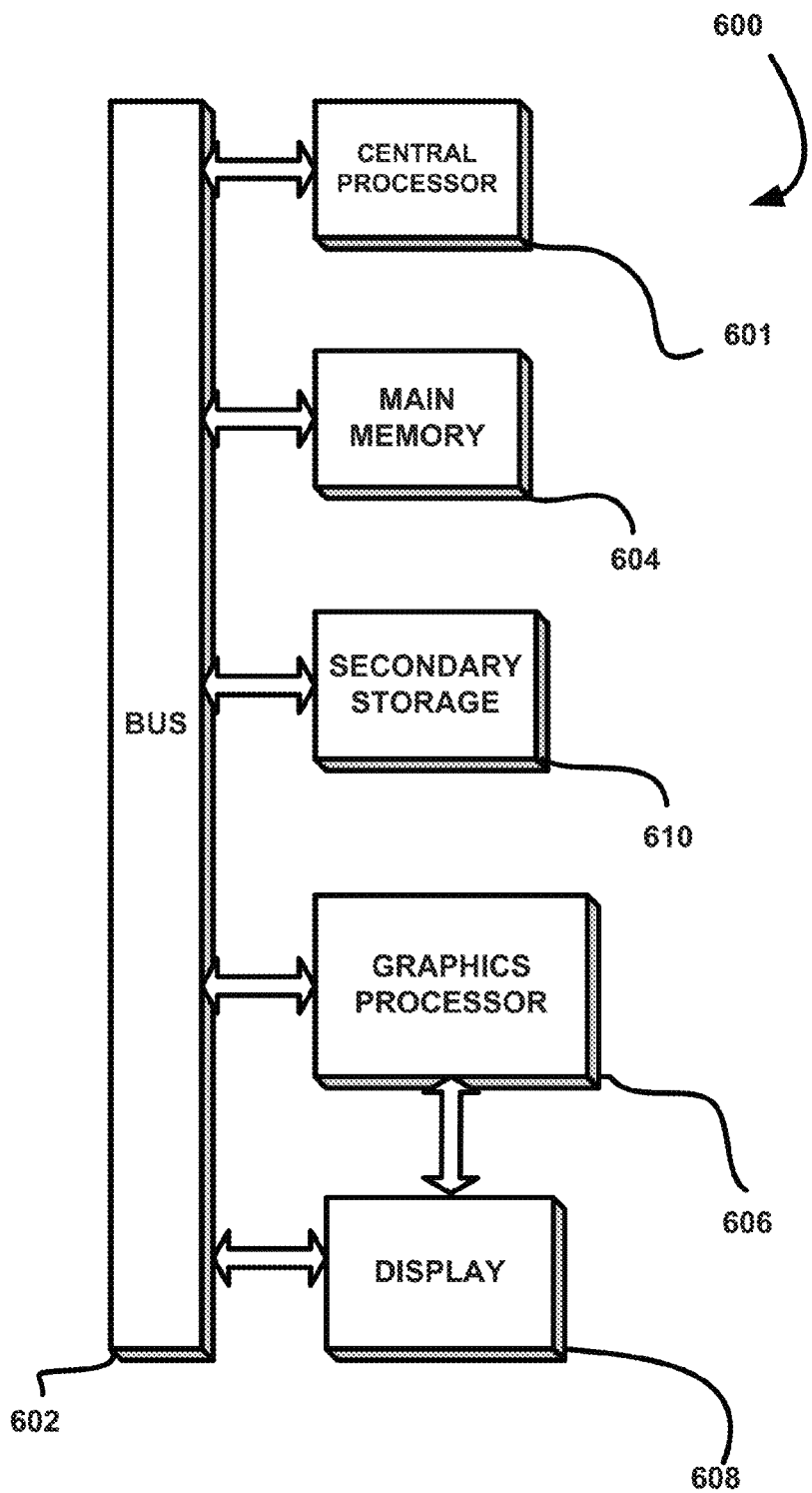
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610, volatile or non-volatile storage, and/or any other type of storage are possible examples of non-transitory computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, and/ or any other type of logic. Still yet, the system 600 may take the form of various other devices including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method that is executed by a graphics processor including a plurality of shader modules, comprising:

identifying, via the graphics processor, a first element of a scene that is associated with a first light path of the scene, where the first light path corresponds to a predetermined pixel of an image within the scene and is associated with a plurality of elements of the scene;

selecting, via the graphics processor, a second element of the scene that is associated with the light path, using a selection heuristic;

determining, via the graphics processor, properties of the first and second elements of the scene;

selecting, via the graphics processor, a first set of light paths, where each element of the first set of light paths satisfies a first similarity measure with the first light path of the scene;

determining, via the graphics processor, statistical information from the determined properties of the first and second elements of the scene and the selected first set of light paths;

selecting, via the graphics processor, a second set of light paths by selecting a subset of a plurality of light paths corresponding to pixels neighboring the predetermined pixel corresponding to the first light path, where each element of the second set of light paths satisfies a second similarity measure with the first light path of the scene and the determined statistical information, and the second similarity measure includes a distance criterion that is computed based on a light path length estimated as a sum of a first distance from an eye to a first path vertex and a second distance from the first path vertex to a second path vertex; and determining, via the graphics processor, a quantity of light received by the first element of the scene by averaging a quantity of light received by elements of the scene that are associated with the selected set of light paths.

2. The method of claim 1, wherein each second element of the scene is selected based on a quantity of light received by the second element, optical properties of the second element, and an arbitrary value.

3. The method of claim 2, wherein each arbitrary value is obtained by combining a position of each first element in a generated image with at least one of a pseudo-random number generator or quasi-Monte Carlo points.

4. The method of claim 1, wherein the properties of the first and second elements include a location of each element in space, a surface normal of the element, a diffuse reflectance of the element, and a quantity of light received by the element.

5. The method of claim 1, wherein the first similarity measure is based on relative positions of image pixels corresponding to each light path, a divergence of surface normals at selected elements associated with each light path, and the distance criterion.

6. The method of claim 1, wherein determining the statistical information includes:
determining a median of quantities of light transmitted by each light path of the first set of light paths;
determining an average of quantities of light transmitted by each light path of the first set of light paths; and
determining information representative of a distribution of quantities of light in the first set of light paths.

7. The method of claim 6, wherein determining information representative of a distribution of quantities of light in the first set of light paths includes:
for each light path of the first set of light paths, determining a representation range for the quantities of light transmitted by the light path using a difference between the determined median and the determined average of the quantities of light transmitted by the path; and
determining projection coefficients in a function basis, where the coefficients are representative of the distribution of the quantities of light within the representation range.

8. The method of claim 6, wherein the second set of light paths contains the first light path only if a ratio between a quantity of light transmitted by the first light path and the median of quantities of light transmitted by each light path of the first set of light paths is below a predetermined threshold.

9. The method of claim 1, wherein selecting the second set of light paths that satisfy the second similarity measure includes:

determining a surface normal similarity by comparing a surface normal of the selected elements associated with each of the light paths;
determining a length of each of the light paths;
determining a difference between the determined statistical information for each of the light paths; and
determining that the light paths are similar if the determined surface normal similarity, the distance criterion, length, and statistical information difference are below predetermined threshold values.

10. The method of claim 9, wherein the determination of the difference between the determined statistical information for each of the light paths includes:
comparing values of a median and average quantity of light transmitted by each light path of the first set of light paths; and
determining a difference between information representative of a distribution of quantities of light transmitted by each path of the first set of light paths.

11. The method of claim 10, wherein the difference between information representative of the distribution of quantities of light transmitted by each path of the first set of light paths is determined by comparing projection coefficients of each path.

12. The method of claim 1, wherein selecting the second set of light paths that satisfy the second similarity measure includes:
determining whether a virtual light path connecting the first element and the second element through a camera lens can be created; and
determining that the light paths are similar, if the virtual light path can be created.

13. The method of claim 1, wherein the subset of the plurality of light paths corresponding to pixels is determined by determining a maximum distance between elements associated with the second set of light paths that satisfy the second similarity measure.

14. The method of claim 13, wherein the subset of the plurality of light paths corresponding to pixels is reduced by arbitrarily removing pixels.

15. The method of claim 14, wherein the arbitrarily removed pixels are selected using at least one of a pseudo-random number generator or quasi-Monte Carlo points and an offset value representative of a number of elements of the subset of the plurality of light paths corresponding to pixels.

16. The method of claim 1, wherein each element of the scene includes a pixel of the scene.

17. A non-transitory computer-readable storage medium storing instructions that, when executed by a processor, cause the processor to perform steps comprising:
identifying a first element of a scene that is associated with a first light path of the scene, where the first light path corresponds to a predetermined pixel of an image within the scene and is associated with a plurality of elements of the scene;
selecting a second element of the scene that is associated with the light path, using a selection heuristic;
determining properties of the first and second elements of the scene;
selecting a first set of light paths, where each element of the first set of light paths satisfies a first similarity measure with the first light path of the scene;
determining statistical information from the determined properties of the first and second elements of the scene and the selected first set of light paths;
selecting a second set of light paths by selecting a subset of a plurality of light paths corresponding to pixels neighboring the predetermined pixel corresponding to the first light path, where each element of the second set of light paths satisfies a second similarity measure with the first light path of the scene and the determined statistical information, and the second similarity measure includes a distance criterion that is computed based on a light path length estimated as a sum of a first distance from an eye to a first path vertex and a second distance from the first path vertex to a second path vertex; and determining a quantity of light received by the first element of the scene by averaging a quantity of light received by elements of the scene that are associated with the selected set of light paths.

18. A system, comprising:
a graphics processor configured to:
- identifying a first element of a scene that is associated with a first light path of the scene, where the first light path corresponds to a predetermined pixel of an image within the scene and is associated with a plurality of elements of the scene;
- selecting a second element of the scene that is associated with the light path, using a selection heuristic;
- determining properties of the first and second elements of the scene;
- selecting a first set of light paths, where each element of the first set of light paths satisfies a first similarity measure with the first light path of the scene;
- determining statistical information from the determined properties of the first and second elements of the scene and the selected first set of light paths;
- selecting a second set of light paths by selecting a subset of a plurality of light paths corresponding to pixels neighboring the predetermined pixel corresponding to the first light path, where each element of the second set of light paths satisfies a second similarity measure with the first light path of the scene and the determined statistical information, and the second similarity measure includes a distance criterion that is computed based on a light path length estimated as a sum of a first distance from an eye to a first path vertex and a second distance from the first path vertex to a second path vertex; and
- determining a quantity of light received by the first element of the scene by averaging a quantity of light received by elements of the scene that are associated with the selected set of light paths.

* * * * *